Patented Aug. 22, 1933

1,923,714

UNITED STATES PATENT OFFICE 1,923,714

NITROCELLULOSE COATING COMPOSITION CONTAINING LOW BOILING SOLVENT VEHICLES

Carleton Ellis, Montclair, N. J., assignor to Ellis-Foster Company, a Corporation of New Jersey No Drawing. Application June 19, 1926
Serial No. 117,152

7 Claims. (Cl. 134—26)

This invention relates to nitrocellulose coating compositions containing low boiling solvent vehicles and particularly to such compositions as will yield clear and transparent coatings when applied to various surfaces and allowed to dry.

It is well known that nitrocellulose when dissolved in low boiling solvents, usually such solvents as boil under 100° C., and which include vehicles of the type of acetone, ethyl acetate, mixtures of these with ethyl alcohol, benzol, or other similar low boiling or hygroscopic solvents, will, when applied to various surfaces, become white and opaque, forming either no film at all, or one of poor strength and of considerable opacity. This is known as whitening or blushing of the film and such a blemish is particularly troublesome when said compositions are applied at ordinary room temperature and in humid atmospheres. In order to overcome this, resort has been made to elevated temperatures and artificially dried atmospheres, although such conditions obviously are applicable only in a limited way and at best represents costly methods of overcoming the difficulty. In order to employ nitrocellulose compositions successfully at room temperature, it is the present practice to use considerable amounts of high boiling solvents, that is, compounds boiling well above 100° C. The use of such substances adds substantially to the cost and results in relatively slow drying.

By incorporating with nitrocellulose synthetic resins highly compatible therewith and in some cases even having a slight solvent or colloiding action on the nitrocellulose, I may employ various low boiling solvents such as acetone, methyl acetone, methyl acetate, ethyl acetate, and the like, and obtain from such solutions clear and transparent films of satisfactory strength, thus making unnecessary the use of high boiling solvents or special drying conditions. This, of course, is of considerable economic advantage, when rapid drying is desired.

Unlike natural resins which have no such action on nitrocellulose and which merely mix with nitrocellulose in solution, certain types of synthetic resins have been found to possess a noticeable colloiding effect and great compatibility for nitrocellulose. Particularly is this true of those synthetic resins which can be made by chemically combining glycerol or other polyhydric alcohols with phthalic acid or its anhydride, or various modifications thereof. Other polybasic acids such as citric, tartaric, maleic, malic, and like substances, are, in most cases, suitable for similar purposes. In place of glycerol, I may employ such other polyhydric alcohols as ethylene and propylene glycols, mannitol, pentaerythritol, and like substances. Various mixtures of acids are often more desirable than any one acid. Thus resins made from phthalic anhydride and glycerol may be advantageously modified by incorporating certain amounts of the fatty acids of various oils such as cottonseed oil, linseed oil, and the like, or by means of monobasic carboxylic acids, such as benzoic, salicylic, benzoyl-benzoic acid, and the like.

One suitable resin, for example, is made substantially as follows:

47 parts by weight of glycerol are added to 80 parts by weight of phthalic anhydride and 40 parts by weight of the distilled fatty acids obtained from cottonseed oil. The mixture is heated in a suitable container such as an aluminum kettle, preferably closed at the top, except for an air-cooled reflux condenser, and the mixture is heated slowly, preferably with mechanical agitation, to a temperature of about 280° C. until a sample of the mixture has shown the desired hardness or the acidity has been sufficiently reduced, e. g., so as to have an acid number of substantially less than twenty. Another suitable resin is made from glycerol 47 parts by weight, phthalic anhydride 118 parts by weight, and benzoic acid 98 parts by weight. This resin is made in identical manner as the foregoing resin.

Still another suitable resin of a harder nature may be made by combining 47 parts by weight of glycerol with 94 parts by weight of phthalic anhydride. This mixture is inclined to polymerize and become infusible at higher temperatures, or if heated for too long a period, so that it is advisable to heat this mixture to a temperature not substantially in excess of 230° C., and continuing until a sample has shown the desired degree of hardness.

These synthetic resins are soluble in acetone and many other solvents and may be incorporated with nitrocellulose in any desired proportion to form lacquer coatings. It is usually necessary to employ a fairly large proportion of these resins, for example, at least equal parts of resin and nitrocellulose and preferably somewhat more, in order to obtain the desired effect. Plasticizers or softeners for nitrocellulose may be added where desired, such materials as diethyl or dibutyl phthalate and tricresyl phosphate being especially recommended.

These synthetic resins with nitrocellulose, with or without plasticizers, pigments, dyes, or other substances, may be dissolved in acetone, ethyl acetate, mixtures thereof, with or without the addition of diluents such as low boiling alcohols, benzol, and the like, to form lacquers of suitable characteristics. By means of these synthetic resins I am able to use these low boiling solvents with nitrocellulose and obtain clear and transparent and non-blushing films at ordinary room temperature. This effect cannot be obtained from natural resins such as rosin, rosin ester and dammar, or other resins which have no appreciable solvent action for the nitrocellulose.

One suitable composition may be made by dissolving 1 part by weight of one-half second viscosity nitrocellulose and 2 parts by weight of a cottonseed fatty acid phthalic glyceride resin in 7 parts by weight of acetone. Other synthetic resins having for nitrocellulose the properties aforesaid, may be employed in place of the one specified. Other low boiling solvents may be employed in place of the acetone and the proportions may be varied considerably without departing from the principles of this invention.

To recapitulate, my invention relates to coating compositions containing nitrocellulose, especially low viscosity nitrocellulse, dissolved in a vehicle, such as one composed solely of low boiling liquids, which vehicle alone does not permit the nitrocellulose, on drying, to yield a clear transparent film; this serious defect being corrected, not by the addition of costly high boiling solvents, but by the introduction of an adequate proportion of a synthetic resin of notable compatibility with nitrocellulose. In this manner blushing is eliminated, drying becomes more rapid, the total solids are desirably increased and an improved gloss is secured. Briefly, therefore, my invention relates to a coating composition comprising nitrocellulose dissolved in a volatile solvent of a blush-forming character incorporated with a blush-corrective synthetic resin.

What I claim is:

1. A coating composition comprising a low viscosity nitrocellulose dissolved in a volatile vehicle of a blush-forming character and a resin of the polyhydric alcohol-polybasic acid type in amount sufficient to yield a substantially non-blushing composition.

2. A coating composition comprising nitro-cellulose, a volatile vehicle of a blush-forming character and an oil-fatty acid phthalic resin, there being at least equal parts by weight of resin and nitrocellulose in the composition.

3. A coating composition comprising nitrocellulose dissolved in a volatile vehicle of blush-forming character and a polyhydric alcohol-polybasic acid-monobasic acid resin in amount sufficient to yield a substantially non-blushing composition.

4. A coating composition comprising nitrocellulose dissolved in a volatile vehicle of blush-forming character and a resin of the polyhydric alcohol-polybasic acid-linseed acids type in amount sufficient to yield a substantially non-blushing composition.

5. A coating composition comprising nitrocellulose dissolved in a volatile vehicle of blush-forming character and a resin of the polyhydric alcohol-polybasic acid type including a benzoyl benzoic acid-polyhydric alcohol resin, the resin content being present in amount sufficient to yield a substantially non-blushing composition.

6. A composition of matter comprising nitrocellulose and a salicylic phthalic glycerol resin.

7. A composition containing nitrocellulose in solution in a solvent that normally deposits a blushed coating, and a fat acid resin in amount sufficient to prevent such blushing in the deposited coating.

CARLETON ELLIS.